United States Patent [19]

Heinzl et al.

[11] Patent Number: 4,735,862

[45] Date of Patent: Apr. 5, 1988

[54] AEROSTATIC BEARING

[75] Inventors: Joachim Heinzl, Munich; Manfred Lehmann, Puchheim; Hans Zehentbauer, Germering, all of Fed. Rep. of Germany

[73] Assignee: Dr.-Ing. Rudolf Hell GmbH, Fed. Rep. of Germany

[21] Appl. No.: 46,094

[22] Filed: May 5, 1987

[51] Int. Cl.⁴ .............................................. B22F 3/10
[52] U.S. Cl. ................... 128/550; 29/149.5 A; 29/149.5 S; 29/149.5 PM; 264/125; 264/139; 264/162; 384/625; 384/902; 384/907; 428/314.2; 428/315.9; 428/316.6; 428/304.4
[58] Field of Search ............... 428/550314.2, 315.9, 428/316.6, 304.4; 29/149.5 A, 149.5 S, 149.5 PM; 384/625, 902, 907; 264/125, 139, 162

[56] References Cited

U.S. PATENT DOCUMENTS

| | | | |
|---|---|---|---|
| 2,187,755 | 1/1940 | Ryder | 384/625 |
| 2,214,104 | 9/1940 | Hildabolt et al. | 428/550 |
| 2,995,462 | 8/1961 | Mitchell et al. | 428/550 |
| 4,013,326 | 3/1977 | King | 384/113 |
| 4,026,657 | 5/1977 | Chimura | 384/625 |
| 4,030,784 | 6/1977 | King et al. | 384/114 |

Primary Examiner—Stephen J. Lechert, Jr.
Attorney, Agent, or Firm—Hill, Van Santen, Steadman & Simpson

[57] ABSTRACT

A gas bearing is formed of a bearing member of sintered material. Sintered grains of a layer forming a desired bearing surface are deformed into the shape of a honeycomb in non-cutting fashion and are subsequently finely worked in cutting fashion, so that super-fine pores formed at corners of the honeycomb arise and which form nozzles.

14 Claims, 1 Drawing Sheet

AEROSTATIC BEARING

BACKGROUND OF THE INVENTION

1. Field of the Invention

The invention is directed to a gas bearing comprising a bearing member formed of sintered grains and wherein at least one bearing surface layer is provided.

2. Description of the Prior Art

Numerous publications are concerned with gas bearings whose bearing members are formed of sintered material.

A fundamental discussion of such bearings may be found in an article by "Schmidt" (wt-Z including Fertig. 61 (1971), pp. 616–617). Beyond this, German No. A 31 10 712 discloses porous air bearings having intentionally compressed surfaces.

These publications are only cited as examples of the extensive prior art.

Various types of porous gas bearings have been known in practice.

(a) Gas bearings are known wherein the feed air is throttled given streams through the full sintered surface having an overall lower porosity. The full resistance is constant and high in the overall material. Very high tolerance demands of the sintered blank thus result if the bearing surface is to be subjected to little processing.

Sintered metals and artificial carbon are employed as initial materials.

(b) Gas bearings are known wherein feed air is throttled at the bearing surface. In order to achieve this throttling, the pre-processed bearing surfaces of the sintered material are compressed by grinding with loose grain under pressure. Only the entire bearing surface can thus be simultaneously processed. No reliable statement with respect to the residual thickness remaining after the grinding, and with respect to the mechanical stability of the uppermost grain layer can be made. The remaining throttle openings are non-uniformly distributed at the bearing surface. Residues of the loose grinding grain can be embedded in the sintered material in the region of the bearing surface.

(c) Gas bearings are known wherein thin nozzle plates are applied as throttle elements on a porous base material serving the purpose of feed air supply.

SUMMARY OF THE INVENTION

An object of the invention is to design the bearings such that they have greater stiffness in comparison to the prior art and such that the operating reliability is guaranteed for a high useful life. Above all, the manufacture of the bearings should be able to occur with an economical manufacturing method.

It is thus necessary, in order to achieve a high carrying power and an optimum stiffness, that the air feed into the bearing be distributed over the entire bearing surface with the greatest possible number of extremely small openings so that carrying pressure is built up everywhere. A throttling, i.e. a pressure drop dependent on the mass stream, would have to occur in the feed so that a nip change would result in a high force modification. A high stiffness is thus guaranteed. The throttling should occur immediately upon entrance of the air into the bearing gap so that dead volumes injurious to stability are kept as small as possible. By contrast, the flow resistance in the basic structure (preceding the throttles in the bearing material) should be low, so that the mass stream for maintaining the carrying air pillow can be replenished in unimpeded fashion.

This object is achieved by a gas bearing wherein a bearing surface layer of sintered grains is provided which are shaped as a honeycomb such that super-fine pores are provided at corners of the honeycomb. In a method of the invention, this bearing surface layer is formed so that it has a highest packing density of the sintered grains. Preferably, the bearing surface layer is rolled with a rolling motion. The rolling motion may be superimposed with a slight sliding motion. After the rolling, a cutting step may be provided and up to half a grain diameter may be cut off.

A particular advantage of the invention is that the thin throttle layer is situated directly at the bearing surface, so that the demand for low dead volume following the throttle openings is met.

The large number of super-fine pores produces an air feed uniformly distributed over the bearing surface, and thus produces a high carrying power given low air consumption. Since the bearing structure is not compressed, the flow resistance of the basic structure is low, i.e. the air is uniformly replenished, and the bearing behavior is stable.

The honeycomb structure of the bearing surface which results is characterized by the sintered grains of the surface layer which can be very greatly squeezed against one another. The contact locations to the neighboring grains are thus very greatly increased, so that an extremely stable composite arises in the surface. The originally existing number of contact locations is not changed due to the processing method. No cut sintered particles can exist, since these are only hung at a weakened contact location and disengage during operation.

Proceeding from sinter blanks that are easy to manufacture, the surface is compressed by rolling in one work step such that both the desired super-fine, uniformly distributed nozzle openings arise and the form precision of the bearing surface is also approximated in an extremely good fashion. By replacing the rolling tool with a cutting tool (cutting diamond), the required air bearing precision can be achieved in one chucking on suitable machines. The mass through-put through the bearing surface required for optimum carrying power and stiffness can be monitored during the processing. The cooperating member of the air bearing, which need not contain any nozzle openings, can be easily adapted.

DESCRIPTION OF THE PREFERRED EMBODIMENTS

Figure 1:
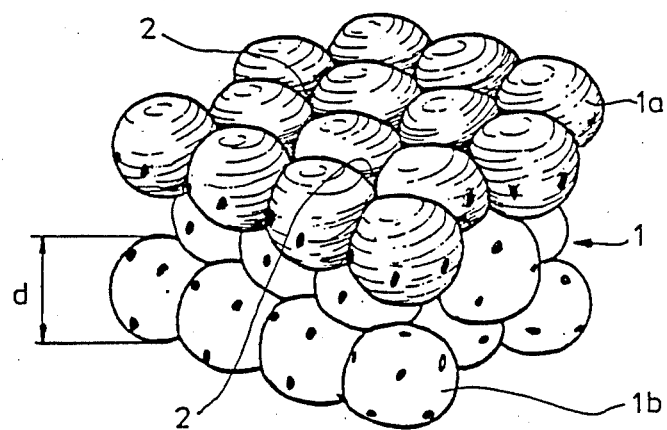
FIG. 1 shows a sintered blank before working.

The portion of a sintered member 1 shown schematically and greatly enlarged in FIG. 1 represents the unworked sintered blank.

For a stable structure of the bearing blanks, the sinter grains 1a, 1b should be arranged as densely as possible. The sinter grains 1a should be distributed in the tightest possible arrangement at the surface which will become the bearing surface in order to avoid "holes".

When filling the sintering form, the surface which will become the bearing surface is therefore first covered with sintering grains 1a. In a further development of the sintered blank, this surface layer could also be constructed of smaller sintering grains 1a than those shown here. The carrying basic structure can be fashioned with sintered grains 1b having a coarser granulation.

As already mentioned, a great plurality of uniformly distributed pores 2 is necessary directly at the bearing surface for a high stiffness and carrying power.

Figure 2:
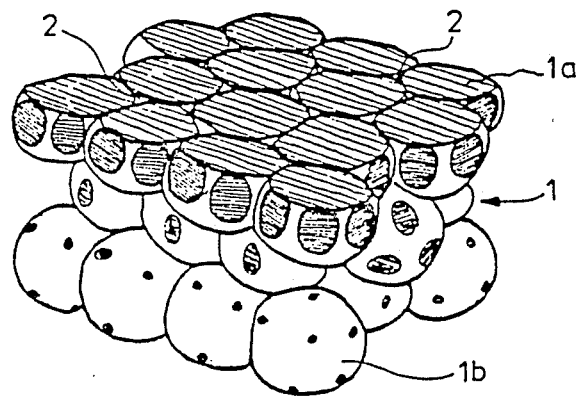
FIG. 2 illustrates the sintered part of FIG. 1 after the rolling.

Given the design of the invention, the sinter grains 1a of the uppermost layer are deformed for this purpose by being plastically rolled against one another such that a flat surface comprising a honeycombed structure having many uniformly distributed, super-fine pores 2 in the honeycomb corners arises, as shown in FIG. 2.

The desired compressing for achieving the throttle effect up to a optimum residual nozzle surface can be achieved by measuring the mass through-put through the bearing surface. Compression by rollers can be continued until the bearing surface is completely closed.

It is thus possible to entirely close individual regions in the bearing surface, but, by contrast, to leave nozzle openings in the form of pores 2 open in other regions. In the plastic deformation of the sintered grains 1a by rolling, the tool can roll and/or slide over the surface dependent on the guidance of the rolling member.

In tests, arrangements wherein the edge of a ball bearing is conducted across the surface placed at a slight angle have proven themselves, so that a sliding component is superimposed on the rolling motion given high surface pressing.

A fine working by cutting can occur after the rolling, this ensuing by a milling or turning with diamond tools. The dimensional precision required for air bearings can thus be achieved without further effort.

Figure 3:
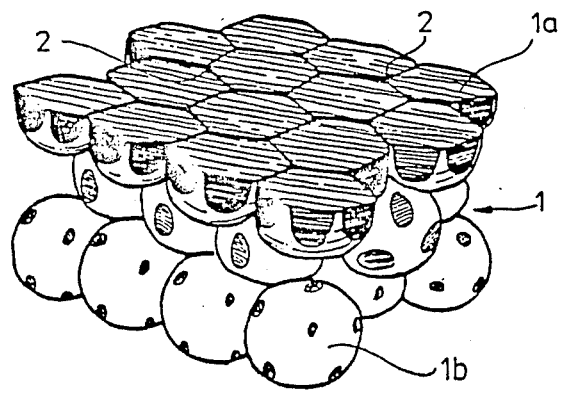
FIG. 3 shows the sintered part rolled in accordance with FIG. 2 after the cutting super-fine working.

The necessary dimensional tolerances can also be more easily governed with the invention. Sintered blanks whose dimensional trueness is greatly dependent on sintering temperature, sintering pressure, and sintering duration, serve as an initial material. Standard fluctuations lie in the range from 2 through 5% of the nominal dimension. The shape deviation of the exit surface is about 1 grain diameter d. During compression by rolling, the shape deviation is improved to d/10. The shape deviation is reduced to d/100 by milling or turning with diamond tools, and what is thereby achieved is that the bearing surface arises approximately in the middle of the uppermost grain layer, as may be seen from FIG. 3. The mechanical stability of the bearing surface which was already initially cited may also be seen from FIG. 3. The contact locations to the neighboring sintered grains 1a and 1b have been greatly enlarged by the rolling process, so that an extremely stable composite arises in the surface. The original number of contact locations is not reduced by cutting working. No greatly cut sintered grains 1a can arise which are connected to the union only at a weakened contact location and which could detach during operation.

Although various minor changes and modifications might be proposed by those skilled in the art, it will be understood that we wish to include within the claims of the patent warranted hereon all such changes and modifications as reasonably come within our contribution to the art.

We claim as our invention:

1. A gas bearing, comprising:
   a bearing member having surface layers, bearing member and surface layers are built-up from sintered grains, at least one of said surface layers forming a bearig surface of said gas bearing; and
   the sintered grains of said at least one surface layer being shaped as honeycombs such that adjacent grains in the surface layer having greater contact with each other and that super-fine pores are provided a corners of the honeycombs.

2. A gas bearing according to claim 1, wherein the sintered grains of the surface layer forming the bearing surface have a smaller grain size than the sintered grains of a remainder of the bearing member.

3. A gas bearing according to claim 1, wherein the sintered grains of the surface layer forming the bearing surface are cut to obtain a desired precision of said bearing surface.

4. A method for manufacturing a gas bearing having a bearing member of sintered grains so as to form at least one bearing surface on said bearing member having superfine pores, comprising the steps of:
   surface layers of said bearing member from sintered grains; and
   shaping the grains of at least one of said surface layers forming a bearing surface as honeycombs such that adjacent grains in the surface layer have greater contact with each other and that super-fine pores are provided at corners of the honeycombs.

5. A method according to claim 4, wherein the shaping of the grains is performed by a rolling process.

6. A method according to claim 5 including the further step of superimposing a sliding motion with a rolling motion during the rolling process, said sliding motion being relatively small compared to the rolling motion.

7. A method according to claim 4 including the step of cutting the shaped grains of the surface layer forming the bearing surface so as to obtain a desired precision of the bearing surface of said gas bearing.

8. A method according to claim 7, wherein said cutting step is performed by turning.

9. A method according to claim 7, wherein said cutting step is performed by milling.

10. A method according to claim 4, wherein a highest packing density of the grains is achieved in said surface layer forming the bearing surface of the gas bearing.

11. A method according to claim 7, wherein said cutting step cuts up the grains of said surface layer forming the bearing surface to a maximum of a half of a grain diameter.

12. A method according to claim 4 including the step of providing the surface layer of said bearing member forming the bearing surface with grains of smaller grain size than that of the remaining grains of said bearing member.

13. A method of constructing a gas bearing of sintered grains and wherein a bearing surface is provided with pores therein, comprising steps of:
   providing a plurality of surface layers of sintered grains; and
   at least one surface layer the surface of which is to become a bearing surface being plastically deformed by rolling the sintered grains of the surface layer such that the adjacent grains become in greater intimate contact with one another, and wherein pores between the grains become smaller so as to form honeycombs with super-fine pores at corners of the honeycombs between adjacent grains.

14. A method according to claim 13 wherein the rolled grains of the surface layer are cut to achieve super-fine pores which are finer than the pores existing after said rolling step and so as to provide a bearing surface on the surface layer at which surface the adjacent grains are in greater instimate contact than was the case after said rolling step.

* * * * *